United States Patent
Ueki et al.

(10) Patent No.: US 10,154,383 B2
(45) Date of Patent: Dec. 11, 2018

(54) WIRELESS COMMUNICATION CONTROL SYSTEM, WIRELESS COMMUNICATION CONTROL APPARATUS, METHOD FOR CONTROLLING WIRELESS COMMUNICATION, METHOD FOR PRODUCING DIRECTIVITY INFORMATION, AND RADIO

(71) Applicant: OMRON Corporation, Kyoto-shi, Kyoto (JP)

(72) Inventors: Daichi Ueki, Kyoto (JP); Keisuke Saito, Suita (JP); Kosuke Hayama, Souraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/659,688

(22) Filed: Jul. 26, 2017

(65) Prior Publication Data
US 2017/0325072 A1 Nov. 9, 2017

Related U.S. Application Data

(63) Continuation of application No. PCT/JP2016/053148, filed on Feb. 3, 2016.

(30) Foreign Application Priority Data

Feb. 13, 2015 (JP) ................................. 2015-026984

(51) Int. Cl.
*H04B 7/10* (2017.01)
*H04W 4/04* (2009.01)
(Continued)

(52) U.S. Cl.
CPC ............. *H04W 4/046* (2013.01); *H04B 7/10* (2013.01); *H04Q 9/00* (2013.01); *H04W 4/04* (2013.01);
(Continued)

(58) Field of Classification Search
USPC ........................................... 701/36
See application file for complete search history.

(56) References Cited

U.S. PATENT DOCUMENTS 7,801,490 B1 * 9/2010 Scherzer ............. H04B 17/382
370/328
9,551,781 B2 * 1/2017 Baxley .................. G01S 5/0263
(Continued)

FOREIGN PATENT DOCUMENTS

EP    1571730 A1    9/2005
JP    2001-267991 A    9/2001
(Continued)

OTHER PUBLICATIONS

The extended European search report dated Feb. 1, 2018 in a counterpart European Patent application.
(Continued)

*Primary Examiner* — Tyler D Paige
(74) *Attorney, Agent, or Firm* — Metrolexis Law Group, PLLC

(57) ABSTRACT

A wireless communication control system includes a first radio having a directional antenna, a second radio, a directivity control unit controlling the directivity of the directional antenna, and a directivity information storage unit storing directivity information relating to a directivity, the directivity information being applied to the directional antenna in relation to wireless communication between the first and second radios in accordance with a plurality of change patterns indicating a temporal change in a received signal intensity. The directivity control unit acquires a temporal change in a received signal intensity during wireless communication between the first and second radios, selects, from among pieces of the directivity information stored in the directivity information storage unit, directivity information corresponding to the change pattern corre-
(Continued)

sponding to the temporal change in the received signal intensity, applies the selected directivity information, and executes wireless communication between the first and second radios.

19 Claims, 9 Drawing Sheets

(51) Int. Cl.
    *H04Q 9/00* (2006.01)
    *H04B 7/26* (2006.01)
    *H04B 10/54* (2013.01)
    *H04B 10/556* (2013.01)
    *H04Q 9/02* (2006.01)

(52) U.S. Cl.
    CPC .......... *H04B 7/2612* (2013.01); *H04B 10/541* (2013.01); *H04B 10/5561* (2013.01); *H04Q 9/02* (2013.01)

(56) References Cited

U.S. PATENT DOCUMENTS

| | | | | |
|---|---|---|---|---|
| 9,627,753 | B2* | 4/2017 | Caimi | H04W 64/003 |
| 2002/0032004 | A1* | 3/2002 | Widrow | H04B 3/36 |
| | | | | 455/22 |
| 2002/0034967 | A1* | 3/2002 | Taniguchi | H04W 16/28 |
| | | | | 455/562.1 |
| 2003/0142756 | A1* | 7/2003 | Kohno | H04B 7/0617 |
| | | | | 375/295 |
| 2005/0206564 | A1* | 9/2005 | Mao | H01Q 3/2605 |
| | | | | 342/377 |
| 2006/0252381 | A1* | 11/2006 | Sasaoka | H04W 12/04 |
| | | | | 455/78 |
| 2007/0287473 | A1* | 12/2007 | Dupray | H04W 4/02 |
| | | | | 455/456.1 |
| 2012/0119953 | A1* | 5/2012 | Hosoya | G01S 3/74 |
| | | | | 342/373 |
| 2017/0325072 | A1* | 11/2017 | Ueki | H04W 4/046 |
| 2018/0006508 | A1* | 1/2018 | Ueki | H02J 50/90 |

FOREIGN PATENT DOCUMENTS

| | | |
|---|---|---|
| JP | 2002-94448 A | 3/2002 |
| JP | 2006-74448 A | 3/2006 |
| JP | 2014-225764 A | 12/2014 |

OTHER PUBLICATIONS

English translation of Written Opinion of PCT/JP2016/053148 dated Apr. 26, 2016.

The International Search Report of PCT/JP2016/053148 dated Apr. 26, 2016.

* cited by examiner

FIG. 7

| Change pattern | Received radio wave intensity | Directivity information |
|---|---|---|
| $Y_1$ | $\tau_0: \gamma_{a0}$<br>$\tau_1: \gamma_{a1}$<br>$\vdots$<br>$\tau_n: \gamma_{an}$ | $d_{ab}$ |
| $Y_2$ | $\tau_0: \gamma_{b0}$<br>$\tau_1: \gamma_{b1}$<br>$\vdots$<br>$\tau_n: \gamma_{bn}$ | $d_{cd}$ |
| $Y_3$ | $\tau_0: \gamma_{c0}$<br>$\tau_1: \gamma_{c1}$<br>$\vdots$<br>$\tau_n: \gamma_{cn}$ | $d_{ef}$ |
| $\vdots$ | $\vdots$ | $\vdots$ |

WIRELESS COMMUNICATION CONTROL SYSTEM, WIRELESS COMMUNICATION CONTROL APPARATUS, METHOD FOR CONTROLLING WIRELESS COMMUNICATION, METHOD FOR PRODUCING DIRECTIVITY INFORMATION, AND RADIO

CROSS REFERENCE TO RELATED APPLICATIONS

This application is a continuation application of International Application No. PCT/JP2016/053148, filed on Feb. 3, 2016, which claims priority based on the Article 8 of Patent Cooperation Treaty from prior Japanese Patent Application No. 2015-026984, filed on Feb. 13, 2015, the entire contents of which are incorporated herein by reference.

TECHNICAL FIELD

The disclosure relates to a wireless communication control system for controlling wireless communication between a first radio having a directional antenna and a second radio performing wireless communication therewith.

RELATED ART

Conventionally known is technology in which with regard to wireless communication between a mobile terminal such as a mobile phone and a wireless base station, a directional adaptive array antenna is utilized in the wireless base station. The adaptive array antenna is constituted by a plurality of antenna elements that are spaced apart from each other and can emit a plurality of beams in any direction at any width by controlling these antenna elements. Accordingly, suitable wireless communication can be realized. For example, according to the technology disclosed in Patent Document 1, the movement of a user of a mobile terminal is predicted, and the directivity of the adaptive antenna is controlled based on the result of this prediction.

RELATED ART DOCUMENTS

Patent Documents

Patent Document 1: JP 2002-94448A

SUMMARY OF THE INVENTION

Problem to be Solved by the Invention

In recent years, in the field of FA (factory automation) as well, there is an increasing tendency for wireless communication to be used for the transfer of a control signal to a driving device by a control apparatus or the transfer of measurement data measured by various sensors to a control apparatus for collection, for example. Conventionally, cable communication has been widely used for these signals and data in consideration of the stability of communication. However, if cable communication is used, there is a significant limitation on the design of the manufacturing line because the position of a communication device is fixed. In view of this, it is thought that utilizing wireless communication not only increases the degree of freedom of the design of the manufacturing line but also increases the maintainability of the manufacturing line and a manufacturing apparatus due to elimination of a transfer cable.

On the other hand, wireless communication for transferring a control signal, measurement data, and the like tends to be influenced by external disturbance, in particular, influenced by fading due to the influence of an active object that is present between radios. It is said that in the field of FA, the state of radio waves varies in the space in which wireless communication is performed between radios due to a driving device such as an arm of a manufacturing robot being driving in the space between radios, the radio itself being disposed on a moving object, or an operator moving, and thus an environment in which fading tends to occur is formed. In such an environment in which fading tends to occur, a communication antenna having directivity, it may be preferable to use such as a phased-array antenna for the stability of wireless communication, but even if such an antenna is utilized, it is difficult to maintain suitable wireless communication due to the influence of fading caused by the operation of an object in the space between radios.

One aspect of the present invention was made to solve such problems, and an object of an embodiment of the present invention is to provide technology for suppressing the influence of fading between radios as much as possible while utilizing a directional antenna in a wireless communication control system in the FA field and the like, and suitably performing wireless communication between radios.

Means for Solving the Problems

In order to resolve the above-described issues, an embodiment of the present invention focuses on the fact that fading in a specific space such as in the FA field has a tendency to have regularity along with the behavior of an object in the space. That is, the inventor of the invention thinks that if the behavior of the object, which is the cause for fading, has some sort of regularity, the situation in which such fading occurs can be also understood to some extent in advance, and it is possible to keep wireless communication between radios in a suitable state by controlling the directivity of the directional antenna in accordance with the situation.

Specifically, a wireless communication control system according to one or more embodiments of the present invention includes a first radio having a directional antenna, a second radio formed to be capable of performing wireless communication with the first radio, a directivity information storage unit that stores a plurality of pieces of directivity information relating to a directivity and a change pattern that indicates a temporal change in a received signal intensity in a reception radio in a case where wireless communication is performed with a predetermined directivity, the directivity information being applied to the directional antenna of the first radio in relation to wireless communication between the first radio and the second radio in accordance with a plurality of the change patterns that indicate a temporal change in the received signal intensity in the reception radio, an acquisition unit that acquires a temporal change in the received signal intensity during wireless communication between the first radio and the second radio via the directional antenna to which the predetermined directivity is applied, and an execution unit that selects, from among the pieces of directivity information stored in the directivity information storage unit, directivity information corresponding to the change pattern determined based on the temporal change in the received signal intensity acquired by the acquisition unit, applies the selected directivity information, and executes wireless communication between the first radio and the second radio.

The wireless communication control system according to one or more embodiments of the present invention is a system that performs control relating to wireless communication between the first radio having a directional antenna and a second radio formed to be capable of performing wireless communication therewith. An antenna that can control various directivities according to a conventional technique can be adopted as the directional antenna, and for example, an array antenna, in particular, a phased-array antenna is an example of the directional antenna. In such a directional antenna, the intensity of radio wave emission and the sensitivity of radio wave reception increase in a specific direction, but if failure occurs in this specific direction, the directional antenna is easily influenced by this failure more than an omnidirectional antenna, and it is difficult to perform suitable wireless communication. In view of this, in order to realize suitable wireless communication between the first radio and the second radio, the directivity of a directional antenna of the first radio is controlled.

In the space in which the wireless communication control system according to one or more embodiments of the present invention is installed, such as a factory, a device such as a robot or an operator performs operations such as the manufacture of a product in accordance with a predetermined process. Thus, the first radio and the second radio perform wireless communication in an environment in which this device or operator performs operation. As a result, fading caused by the operation of this device or the operator acts on the wireless communication between the first radio and the second radio.

Here, the operation of this device or operator who manufactures a product follows a predetermined process, and thus it is thought that fading caused by the operation of the operator or the device such as a robot has reproducibility to some extent. Thus, it is thought that the effect of the fading on the wireless communication between the first radio and the second radio also significantly depends on the operation of this device or operator. In view of this, a directivity information storage unit stores, in accordance with a received signal intensity change pattern (hereinafter, also simply referred to as "change pattern") that specifies the operation of this device or operator, directivity information that can be applied to a directional antenna and is set in consideration of fading caused by the operation in a state in which the device or operator performs operation in accordance with a predetermined manufacturing process, the driving directivity information making it possible to perform suitable wireless communication between the first radio and the second radio.

That is, focus is placed on the fact that the influence of fading caused by the operation of the operator or the device such as a robot can be specified by the change pattern in the received signal intensity, and the directivity information storage unit stores directivity information that is applied to the directional antenna corresponding to that change pattern. In other words, this means that the directivity information storage unit stores, for each change pattern, directivity information, which is information relating to the directivity for suitably performing wireless communication between the first radio and the second radio. This directivity information can be obtained by preliminarily experimentally performing the operation of the operator or the device such as a robot, changing the directivity in each change pattern to measure the received signal intensity, and selecting the directivity having a high received signal intensity.

Furthermore, the directivity information storage unit stores a change pattern indicating temporal change in the received signal intensity in the reception radio in the case where wireless communication is performed between the first radio and the second radio in the state in which a predetermined directivity is applied to the directional antenna. This change pattern is used to determine a change pattern with which the execution unit selects directivity information, which will be described later. Note that any directivity can be utilized as the predetermined directivity as long as this determination is possible.

The acquisition unit acquires a temporal change in the received signal intensity during wireless communication between the first radio and the second radio in a state in which the predetermined directivity is applied to the directional antenna. Furthermore, the execution unit specifies a target change pattern with reference to change patterns stored in the directivity information storage unit, based on the temporal change in the received signal intensity acquired by the acquisition unit. Moreover, directivity information corresponding to this change pattern is selected from among pieces of the directivity information stored in the directivity information storage unit, and the selected directivity information is applied to wireless communication between the first radio and the second radio. As a result, the influence of the fading caused by the operation of the operator or the device such as a robot on wireless communication between radios can be suppressed as much as possible in accordance with the change pattern, and accordingly suitable wireless communication can be realized.

Note that the directivity information stored in the directivity information storage unit includes at least one of directivity information corresponding to the direction of wireless communication in which the first radio performs transmission and the second radio performs reception, and directivity information corresponding to the direction of wireless communication in which the second radio performs transmission and the first radio performs reception. Also, it may be preferable that the direction of wireless communication relating to the directivity information selected by the execution unit coincides with the direction of wireless communication between radios when this information is applied. However, if fading that acts on wireless communication between radios can be considered to be the same in the direction of wireless communication in which the first radio performs transmission and the second radio performs reception and the direction of wireless communication in which the second radio performs transmission and the first radio performs reception, shared directivity information may be applied to both directions of wireless communication.

Here, in the above-described wireless communication control system, the directivity information may be information that is set such that in a case where the received signal intensity in a reception radio out of the first radio and the second radio changes in the change pattern, a received signal received by the reception radio has a maximum intensity or is in a predetermined received signal intensity range by applying the directivity information to the directional antenna of the first radio. Note that this predetermined received signal intensity range refers to a range of the received signal intensity required to realize suitable wireless communication between the first radio and the second radio. Thus, by setting directivity information in this manner, in the wireless communication between the first radio and the second radio using a directional antenna to which this directivity information is applied by the execution unit, received signal intensity required for suitable wireless communication is secured.

Also, in the above-described wireless communication control system, the second radio may be disposed on a driving device whose driving is controlled by the control apparatus, and a relative position of the second radio with respect to the first radio may change due to the driving device being moved. In this case, the directivity information is produced in a situation in which the relative positions of the second radio and the first radio change. In this manner, in the mode in which the second radio is disposed on the driving device whose driving is controlled by the control apparatus, the space between the first radio and the second radio tends to vary depending on the relative position of the second radio with respect to the first radio, and wireless communication between the two radios tends to be influenced by fading. On the other hand, suitable information transfer can be realized by disposing the second radio that performs wireless communication instead of cable communication, on the driving device whose driving is controlled in this manner. Therefore, it is possible to suitably apply one aspect of the invention of this application to this mode and realize suitable information transfer via wireless communication.

Meanwhile, the invention of this application does not exclude a mode in which positions of the first radio and the second radio do not change relative to each other in the above-described wireless control system. Even in the mode in which radios do not move in this manner, fading sometimes acts on wireless communication between radios due to the operation of the operator or the device such as a robot near the radios, and thus suitable wireless communication can be realized as described above by applying one aspect of the invention of this application.

Also, the above-described wireless communication control system may include a plurality of the second radios. If a plurality of second radios are included in this manner, the following two aspects are examples of the wireless communication control system according to one or more embodiments of the present invention. As a first aspect, the plurality of second radios are each configured to be capable of alternatively performing communication with the first radio. Also, the directivity information storage unit stores the driving directivity information that corresponds to the plurality of second radios and is applied to the directional antenna of the first radio in relation to wireless communication between the first radio and the plurality of second radios in accordance with the plurality of driving patterns in a state in which driving of the one or more driving devices is controlled in accordance with the plurality of predetermined driving patterns. The execution unit then selects, from among the pieces of directivity information stored in the directivity information storage unit, driving directivity information that corresponds to the target driving pattern acquired by the acquisition unit and corresponds to the plurality of second radios, and executes wireless communication between the first radio and the plurality of second radios in accordance with the selected target driving directivity information. That is, in this first aspect, when the first radio wirelessly communicates with the plurality of second radios, the target driving directivity information is applied to the directional antenna in accordance with wireless communication between radios. Accordingly, wireless communication between radios can be made suitable.

Next, as a second aspect, a second radio group including the plurality of second radios is configured to be capable of performing communication with the first radio. Moreover, the directivity information storage unit stores the driving directivity information that corresponds to the second radio group and is applied to the directional antenna of the first radio in relation to wireless communication between the first radio and the second radio group in accordance with the plurality of driving patterns in a state in which driving of the one or more driving devices is controlled in accordance with the plurality of predetermined driving patterns. Moreover, the execution unit selects, from among the pieces of driving directivity information stored in the directivity information storage unit, target directivity information that corresponds to the target driving pattern acquired by the acquisition unit and corresponds to the second radio group, and executes wireless communication between the first radio and the second radio group in accordance with the selected target driving directivity information. Note that in wireless communication with the second radio group, the first radio may alternatively wirelessly communicate with the second radios, or may wirelessly communicate with the plurality of second radios simultaneously. In this second aspect, when the first radio wirelessly communicates with the second radio group constituted by the plurality of second radios, the target driving directivity information is applied to the directional antenna in accordance with the wireless communication with the second radio group. That is, in the wireless communication with the second radio group, the target driving directivity information that is applied to the directivity antenna serves as shared directivity information. Therefore, when the first radio wirelessly communicates with the plurality of second radios, it is not necessary to modify the directivity information that is applied in accordance with the wireless communication with each of the second radios, and it is possible to achieve suitable wireless communication between radios with simple control.

Also, in the above-described wireless communication control system, the execution unit may execute wireless communication for determining the change pattern with the predetermined directivity every time wireless communication between the first radio and the second radio is executed with the directivity that is based on the selected directivity information for a predetermined period. By determining the change pattern at predetermined intervals as necessary in this manner, it is possible to select appropriate directivity in accordance with the current situation of wireless communication, and to realize suitable wireless communication.

Here, in the above-described wireless communication control system, the second radio may be a sensor-equipped radio including a sensor that measures a predetermined environmental parameter. In this case, one or more embodiments of the invention of this application achieves suitable wireless communication for transferring measurement data measured by the sensor of the second radio to the first radio.

Also, the present invention has an aspect of a wireless communication control apparatus. That is, one embodiment of the present invention is a wireless communication control apparatus that controls wireless communication performed by a first radio configured to be capable of performing wireless communication with a second radio via a directional antenna in a predetermined environment in which driving of one or more driving devices is controlled in accordance with a plurality of predetermined driving patterns, the wireless communication control apparatus including a directivity information storage unit that stores a plurality of pieces of directivity information relating to a directivity and a change pattern that indicates a temporal change in a received signal intensity in a reception radio in a case where wireless communication is performed with a predetermined directivity, the directivity information being applied to the directional antenna of the first radio in relation to wireless communication between the first radio and the second radio in accordance with a plurality of the change patterns that indicate a temporal change in the received signal intensity in the reception radio, an acquisition unit that acquires a temporal change in the received signal intensity during wireless communication between the first radio and the second radio via the directional antenna to which the predetermined directivity is applied, and an execution unit that selects, from among the pieces of directivity information stored in the directivity information storage unit, directivity information corresponding to the change pattern determined based on the temporal change in the received signal intensity acquired by the acquisition unit, applies the selected directivity information, and executes wireless communication between the first radio and the second radio. Accordingly, it is possible to suppress the influence of fading between radios as much as possible and suitably perform wireless communication between radios. Note that the technical idea of an embodiment of the invention of this application disclosed relating to the above-described wireless communication control system can also be applied to the wireless communication control apparatus as long as no technical discrepancy arises. Also, a configuration may be adopted in which the above-described wireless communication control apparatus is included in the first radio.

Here, the present invention also has an aspect of a method for controlling wireless communication. That is, one embodiment of the present invention is a method for controlling wireless communication that controls wireless communication performed by a first radio configured to be capable of performing wireless communication with a second radio via a directional antenna in a predetermined environment in which driving of one or more driving devices is controlled in accordance with a plurality of predetermined driving patterns, the method including an acquisition step of acquiring a temporal change in a received signal intensity during wireless communication between the first radio and the second radio via the directional antenna to which a predetermined directivity is applied, a selection step of selecting, from a directivity information storage unit that stores a plurality of pieces of directivity information relating to a directivity and a change pattern that indicates a temporal change in a received signal intensity in a reception radio in a case where wireless communication is performed with the predetermined directivity, the directivity information being applied to the directional antenna of the first radio in relation to wireless communication between the first radio and the second radio in accordance with a plurality of the change patterns that indicate a temporal change in the received signal intensity in the reception radio, directivity information that corresponds to the change pattern that was determined based on the temporal change in the received signal intensity acquired in the acquisition step, and an execution step of applying the directivity information selected in the selection step and executing wireless communication between the first radio and the second radio. Accordingly, it is possible to suppress the influence of fading between radios as much as possible and suitably perform wireless communication between radios. Note that the technical idea of an embodiment of the invention of this application disclosed relating to the above-described wireless communication control system can also be applied to the wireless communication control method as long as no technical discrepancy arises.

Furthermore, the invention of this application also has an aspect of a method for producing directivity information. That is, one embodiment of the present invention is a directivity information production method for producing directivity information that is applied to a directional antenna in wireless communication control performed by a first radio configured to be capable of performing wireless communication with a second radio via the directional antenna in a predetermined environment in which driving of one or more driving devices is controlled in accordance with a plurality of predetermined driving patterns, the method including a first test radio wave transmission step of transmitting test radio waves from a transmission radio to a reception radio out of the first radio and the second radio in a state in which driving of the one or more driving devices is controlled in accordance with the plurality of driving patterns, a change pattern acquisition step of measuring a change in a received signal intensity of the test radio waves when the test radio waves transmitted from the transmission radio in the first test radio wave transmission step are received by the reception radio, and acquiring a change pattern in the received signal intensity corresponding to the driving pattern, a second test radio wave transmission step of transmitting test radio waves at a plurality of control times that are set in an execution period during which a driving pattern is executed, from a transmission radio to a reception radio out of the first radio and the second radio, in a state in which driving of the one or more driving devices is controlled in accordance with the plurality of driving patterns, and a production step of measuring a received signal intensity of test radio waves when the test radio waves transmitted from the transmission radio in the second test radio wave transmission step are received by the reception radio, and producing driving directivity information relating to a directivity for each change pattern corresponding to the plurality of driving patterns, the driving directivity information being applied to the directional antenna of the first radio in relation to wireless communication between the first radio and the second radio in a state in which driving of the one or more driving devices is controlled in accordance with the plurality of driving patterns such that the received signal has a maximum intensity or is in a predetermined received signal intensity range. Accordingly, it is possible to suppress the influence of fading between radios as much as possible and produce directivity information for achieving suitable wireless communication between radios.

Effects of the Invention

In a wireless communication control system, it is possible to provide technology for suppressing the influence of fading between radios as much as possible while utilizing a directivity antenna, and suitably performing wireless communication between radios.

BRIEF DESCRIPTION OF THE DRAWINGS

FIG. 7 is a diagram showing a schematic structure of a database relating to directivity information provided in the radio 1 included in the wireless communication control system shown in FIG. 1.

EMBODIMENTS OF THE INVENTION

A wireless communication control system (hereinafter, also simply referred to as "system" in some cases) 10 according to one embodiment of the present invention, as well as a radio 1 (first radio) and radios 2a and 2b (second radios or partner communication devices) included in this system will be described with reference to the drawings. Note that the configuration of the following embodiments is merely an example, and the present invention is not limited to the configuration of this embodiment.

Figure 1:
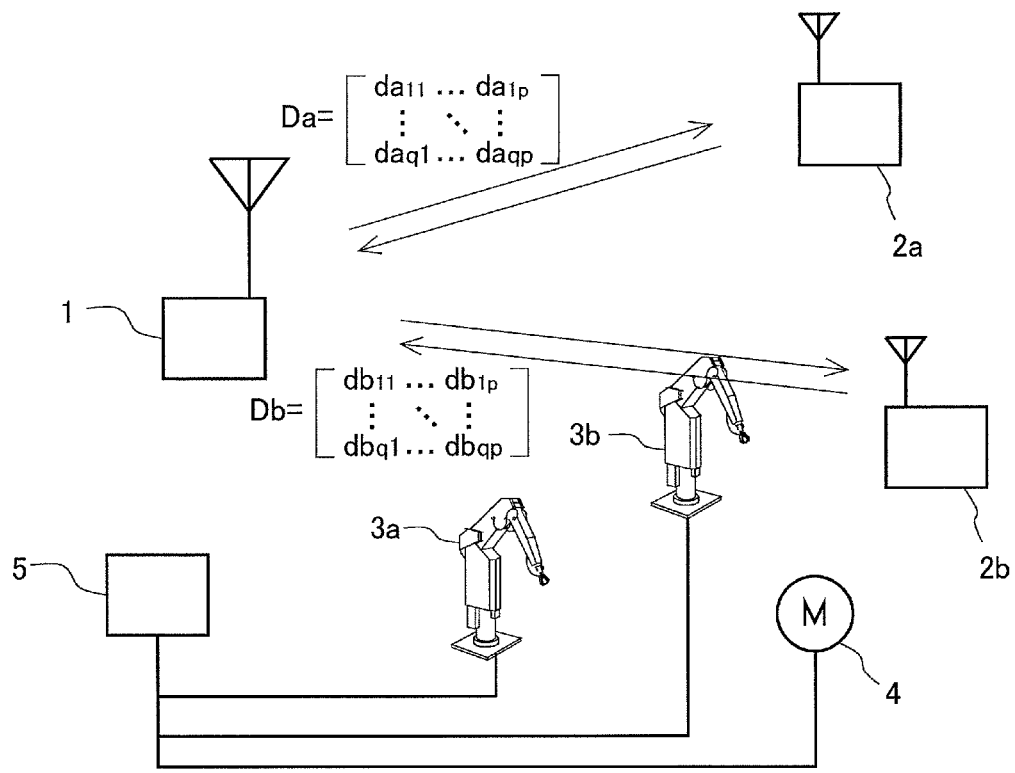
FIG. 1 is a diagram showing a schematic configuration of a wireless communication control system according to one embodiment of the present invention.

FIG. 1 is a diagram showing a schematic configuration of a system 10 used in the field of FA (factory automation) in a factory or the like, and the arrangement of robots 3a and 3b, and a motor 4 whose driving is controlled by a control apparatus 5 included therein. Specifically, the system 10 includes the control apparatus 5 such as a PLC (programmable logic controller), and the driving of the robots 3a and 3b and the motor 4 is controlled by this control apparatus 5 in accordance with a predetermined driving pattern. Note that control of the driving of the robot 3a and the like by the control apparatus 5 is conventional technology, and is not central to one embodiment of the invention of this application, and thus specific description thereof is omitted.

Here, the control apparatus 5 is not electrically connected to the radio 1, but may be connected to the radio 1 with a cable or wirelessly. The radio 1 has a phased-array antenna, which is a directional antenna. The phased-array antenna is an antenna according to a conventional technique, and briefly speaking, it has a directivity control function that can change the direction of transmitting radio waves or conversely increase the sensitivity of reception of radio waves in a specific direction by slightly changing the phase of a signal that is applied to the antenna elements of the antenna array. Therefore, the phased-array antenna of the radio 1 is an antenna that can more sensitively execute the transmission of radio waves in a specific direction and the reception of radio waves in a specific direction compared to other directions, and that can arbitrarily control this specific direction. In one embodiment of the invention of this application, control in this specific direction in the phased-array antenna is referred to as "directivity control in the phased antenna"

By controlling the directivity of the phased-array antenna in this manner, the radio 1 having the phased-array antenna can efficiently deliver radio waves to a radio (partner communication device) that performs wireless communication in the factory in which the system 10 is disposed, and can efficiently receive radio waves from the partner radio. In this working example, a radio 2a and a radio 2b are disposed in the system 10 as the radio that serves as the partner of the radio 1. The radio 2a and the radio 2b are disposed at different positions, and each have an omnidirectional antenna. Thus, when the radio 2a and the radio 2b wirelessly communicate with the above-described radio 1, wireless communication therebetween is in a suitable state, for example the intensity of a signal received by a reception antenna is higher than a predetermined threshold, due to independently controlling the directivity of the phased-array antenna of the radio 1 in wireless communication with the radio 2a and wireless communication with the radio 2b. Note that in FIG. 1, the directivity of the phased-array antenna is represented by Da in the case where the radio 1 wirelessly communicates with the radio 2a, and the directivity of the phased-array antenna in the case where the radio 1 wirelessly communicates with the radio 2b is represented by Db.

Also, the radios 2a and 2b are each provided with a sensor for measuring outside environment parameters (temperature, humidity, acceleration, and the like). Information measured by the provided sensor (measurement information) is transmitted from the radio 2 to the radio 1, and is collected in the radio 1, and is subjected to predetermined processing in the control apparatus 5. Here, examples of the sensor provided in the radios 2a and 2b include physical system sensors such as a temperature sensor, a humidity sensor, an illuminance sensor, a flow sensor, a pressure sensor, a ground temperature sensor, and a particle sensor, and chemical system sensors such as a $CO_2$ sensor, a pH sensor, an EC sensor, and a soil moisture sensor. In the present embodiment, in order to simplify the description, it is assumed that the radios 2a and 2b are provided with only a temperature sensor for measuring the external temperature at positions at which the radios 2a and 2b are disposed.

In the system 10 having such a configuration, in a state in which the driving of the robots 3a and 3b and the motor 4 is controlled by the control apparatus 5 in order to manufacture a product in the factory, or in a state in which an operator performs operation to manufacture a product, information on the temperature measured by the temperature sensors at the positions at which the radios 2a and 2b are installed is transferred to the radio 1 through wireless communication. Also, required control information is transferred from the radio 1 to the radios 2a and 2b in accordance with the states of the radios 2a and 2b. In this embodiment, the control apparatus 5 is not electrically connected to the radio 1, but in order to transfer the temperature information received from the radios 2a and 2b to the control apparatus 5, or to receive control information that is to be transmitted to the radios 2a and 2b from the control apparatus 5, the control apparatus 5 and the radio 1 may be connected to each other.

Here, wireless communication between the radio 1 and the radios 2a and 2b can be performed relatively stably due to the directivity of the phased-array antenna of the radio 1 in particular. Thus, it is expected to be able to efficiently transfer the information on the temperature measured by the radios 2a and 2b to the radio 1. On the other hand, in the system 10 placed in the FA environment, the robots 3a and 3b move their arms and the like in accordance with a control instruction given from the control apparatus 5, and the driving of the motor 4 moves an object that is to be driven (for example, a table of a machine tool). Here, bodies of robots 3a and the like and objects to be driven by the motor 4 are made of metal in many cases. If an object having such a metal body moves in the space in which the system 10 is disposed, fading acts on wireless communication between the radio 1 and the radios 2a and 2b. Also, in the space in which the system 10 is disposed, fading sometimes occurs due to not only the device that is controlled by the control apparatus 5 but also the operator moving and blocking a communication path, or the operator moving the device or the like, for example. Fading acts in the space in which the system 10 is disposed in this manner due to movement of a device or a person, and thus there is a risk that stable wireless communication will be inhibited. Even if the radio 1 performs wireless communication utilizing the phased-array antenna, there is a risk that fading caused by the driving of the robot 3a and the like or movement of a person will act on the wireless communication, whereas if fading acts on wireless communication in the set direction due to a high directivity of the phased-array antenna, there is a possibility that the effect of the directivity cannot be sufficiently enjoyed and the stability of wireless communication will decrease significantly. Also, in the FA environment, the movement of the device and person is regularly repeated in accordance with a manufacturing process, and thus there is a risk that fading will act repeatedly.

Figure 2:
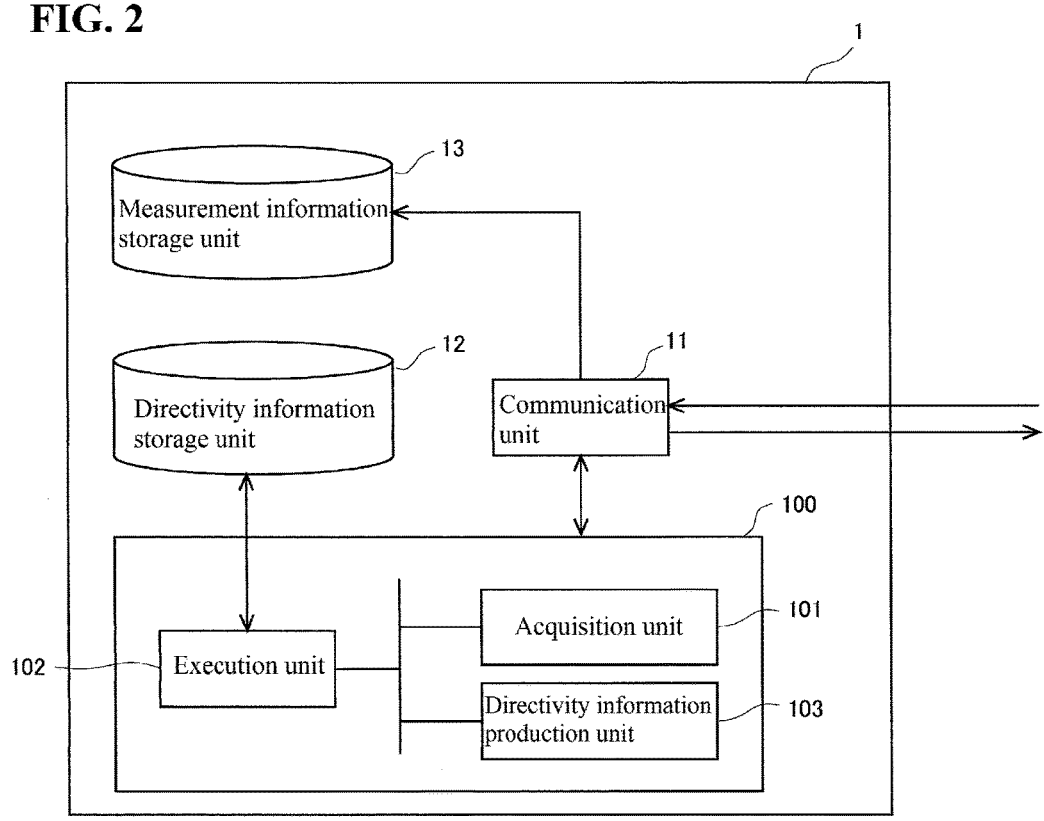
FIG. 2 is a functional block diagram of a radio 1 included in the wireless communication control system shown in FIG. 1.
Figure 3:
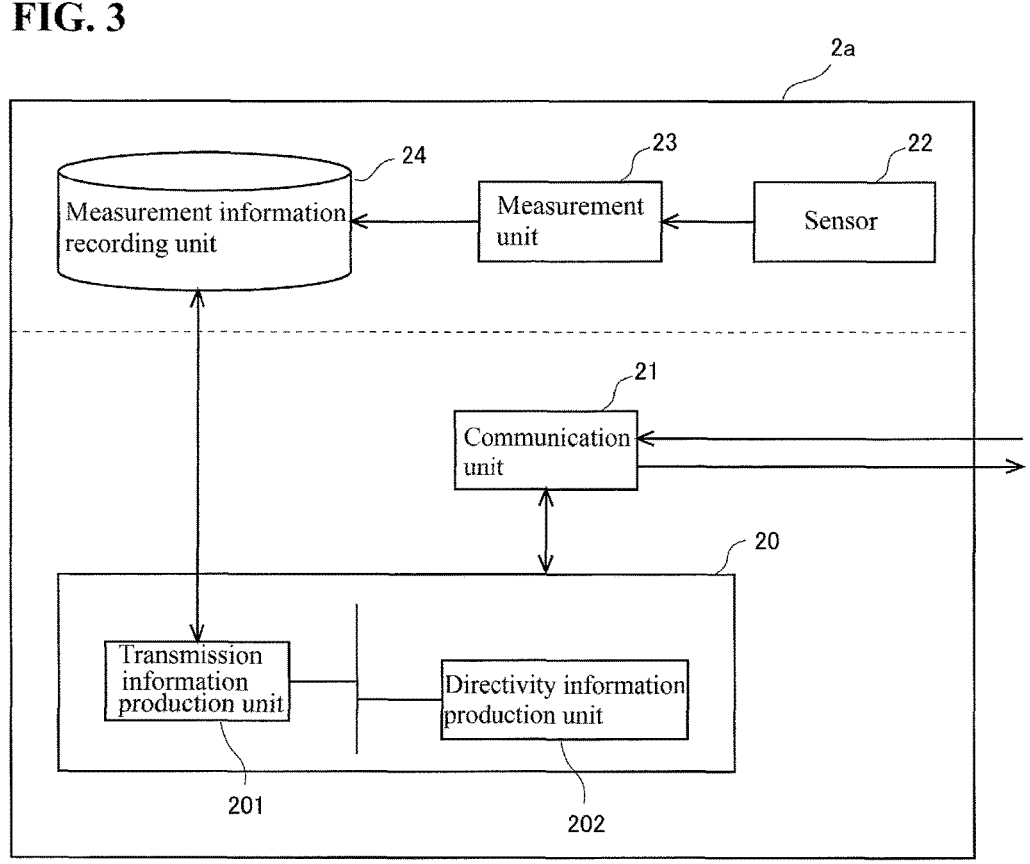
FIG. 3 is a functional block diagram of a radio 2a included in the wireless communication control system shown in FIG. 1.

In view of this, in order to suppress a decrease in the stability of wireless communication between radios due to fading as much as possible, focus is placed on the regularity of fading in the FA environment, and the system 10 according to one embodiment of the invention of this application adopts a configuration in which the directivity of the phased-array antenna of the radio 1 is controlled in accordance with the change pattern of the received signal intensity. Specifically, the radio 1 and the radios 2a and 2b are configured as shown in FIGS. 2 and 3. The radio 1 and the radios 2a and 2b internally have arithmetic units, memories, and the like, and exhibit not only the wireless communication function but also various functions due to a predetermined control program being executed by these arithmetic units. FIGS. 2 and 3 are functional block diagrams showing an illustration of the functions of the radio 1 and radios 2a and 2b. Note that the radio 2a and the radio 2b have basically the same functions, and thus in this embodiment, FIG. 3 shows a functional block diagram of the radio 2a as a representative example.

First, the radio 1 has a control unit 100, a communication unit 11, a directivity information storage unit 12, and a measurement information storage unit 13 as functional units. Hereinafter, functional units of the radio 1 will be described. The control unit 100 is a functional unit that performs various control in the radio 1, and in particular, has an acquisition unit 101, an execution unit 102, and a directivity information production unit 103. That is, the control unit 100 is one mode of a directivity control unit. In the FA environment, the driving of the robot 3a and the like is regularly repeatedly controlled by the control apparatus 5 in accordance with a predetermined driving pattern, and an operator repeats operations in accordance with a predetermined manufacturing process, and thereby fading often acts regularly. Thus, in the radio 1, a change in the received signal intensity caused by the operation of the operator or the device such as the robot 3a or the like is stored as a change pattern in the directivity information storage unit 12, a temporal change in the received signal intensity is acquired during wireless communication, and the corresponding change pattern is specified in the directivity information storage unit 12. That is, the radio 1 specifies the operation of the operator or the device such as the robot 3a or the like in accordance with the change pattern of the received signal intensity.

The acquisition unit 101 is a functional unit that acquires a temporal change in the received signal intensity during wireless communication between the radio 1 and the radios 2a and 2b.

Also, the execution unit 102 is a functional unit that selects, from among pieces of directivity information stored in the later-described directivity information storage unit 12, directivity information that corresponds to a change pattern that is determined to correspond to a temporal change in the received signal intensity acquired by the acquisition unit 101, and executes wireless communication between the radio 1 and the radio 2a and the like after controlling the directivity of this phased-array antenna based on the selected directivity information. The directivity information is information relating to the directivity set to the phased-array antenna of the radio 1 in accordance with the temporal change in the received signal intensity caused by the operation of the operator or the device such as the robot 3a or the like, and determines the directivity of the phased-array antenna so as to suitably realize wireless communication between the radio 1 and the radio 2a and the like even at the time of operation of this operator or the device. Thus, if the acquired temporal change in the received signal intensity changes, the execution unit 102 changes the driving directivity information applied to the phased-array antenna in principle. Furthermore, the directivity information production unit 103 is a functional unit that produces the directivity information that is stored in the directivity information storage unit 12 and used by the execution unit 102, together with the radio 2a and the like, which are the partners for wireless communication. A specific mode of producing this directivity information will be described later.

Also, the communication unit 11 is a functional unit that communicates with a device external to the radio 1, that is, transmits and receives information to/from the external device. Specifically, the communication unit 11 is formed so as to interact with the control unit 100. As a result, the communication unit 11 handles reception of information relating to the change pattern, wireless communication between radios to which the directivity information selected by the execution unit 102 is applied, and wireless communication with an external radio at the time of information production performed by the directivity information production unit 103. The directivity information storage unit 12 is a functional unit that stores, in the memory, the directivity information that relates to the directivity and is applied to the directional antenna of the first radio in accordance with a plurality of change patterns that indicate temporal changes in the received signal intensity in relation to wireless communication between the radio 1 and the radios 2a and 2b, and the measurement information storage unit 13 is a functional unit that stores temperature information in the memory after the communication unit 11 receives the information that was measured by and transferred from the radio 2a or the like that is a communication partner. At the time of transferring this temperature information (outside environment parameters), the directivity information stored in the directivity information storage unit 12 is applied to the phased-array antenna.

Next, the functional unit of the radio 2a will be described with reference to FIG. 3. The radio 2a has, as functional units, a control unit 20, a communication unit 21, a measurement unit 23, and a measurement information recording unit 24, and in the case of the present embodiment, the radio 2a is provided with a sensor 22 (a temperature sensor in this example) for measuring outside environment parameters. Hereinafter, functional units of the radio 2a will be described. The control unit 20 is a functional unit that handles various control in the radio 2a, and in particular, has a transmission information production unit 201 and a directivity information production unit 202. This transmission information production unit 201 is a functional unit that produces transmission information including the information on the temperature measured by the sensor 22. Also, the directivity information production unit 202 is a functional unit that produces directivity information utilized by the execution unit 102 in the radio 1 together with the radio 1 that is a partner of wireless communication.

The communication unit 21 is a functional unit that performs wireless communication with the radio 1. Specifically, the communication unit 21 is formed so as to interact with the control unit 20. As a result, the communication unit 21 handles transfer of the transmission information produced by the transmission information production unit 201, and wireless communication between the radio 1 at the time of production of directivity information produced by the directivity information production unit 202, for example. The measurement unit 23 is a functional unit that measures the temperature via the temperature sensor 22 in the environment in which the radio 2a is disposed. Measurement of the temperature by this measurement unit 23 is executed under the instruction of the control unit 20, and the measured temperature information is stored in a memory by the measurement information recording unit 24 at any time. This measurement information recording unit 24 is formed so as to interact with the control unit 20, and the recorded measurement information is passed to the control unit 20 in accordance with the instruction given by the control unit 20, and transmission information is produced by the transmission information production unit 201.

Directivity Information Production Processing

The following describes processing relating to wireless communication between the radio 1 and the radio 2a that have the above configurations, and in particular, wireless communication for transferring information on the temperature measured by the radio 2a to the radio 1. When wireless communication is performed between the radio 1 and the radio 2a, as described above, there is a possibility that the stability of wireless communication will decrease due to the influence of fading caused due to the operation of the operator or the robot 3a or the like being driven by the control apparatus 5 in accordance with a predetermined driving pattern. Here, in the system 10 according to one embodiment of the invention of this application, focus was placed on the fact that fading caused by the operation of the operator, the robot 3a, or the like in the FA field has regularity. Also, this fading, that is, the temporal change in the received signal intensity can be considered to change depending on the operation of the operator, the robot 3a, or the like, which is the cause. In view of this, before a product is manufactured in the factory, experimentally, the control apparatus 5 causes the operator or the device such as the robot 3a or the like to perform operation, and the temporal change (change pattern) in the received signal intensity in wireless communication between the radio 1 and the radio 2a at that time is measured. Considering this influence, the directivity information indicating the directivity applied to the phased-array antenna corresponding to the change pattern is produced so as to achieve a suitable wireless communication state.

Figure 4:
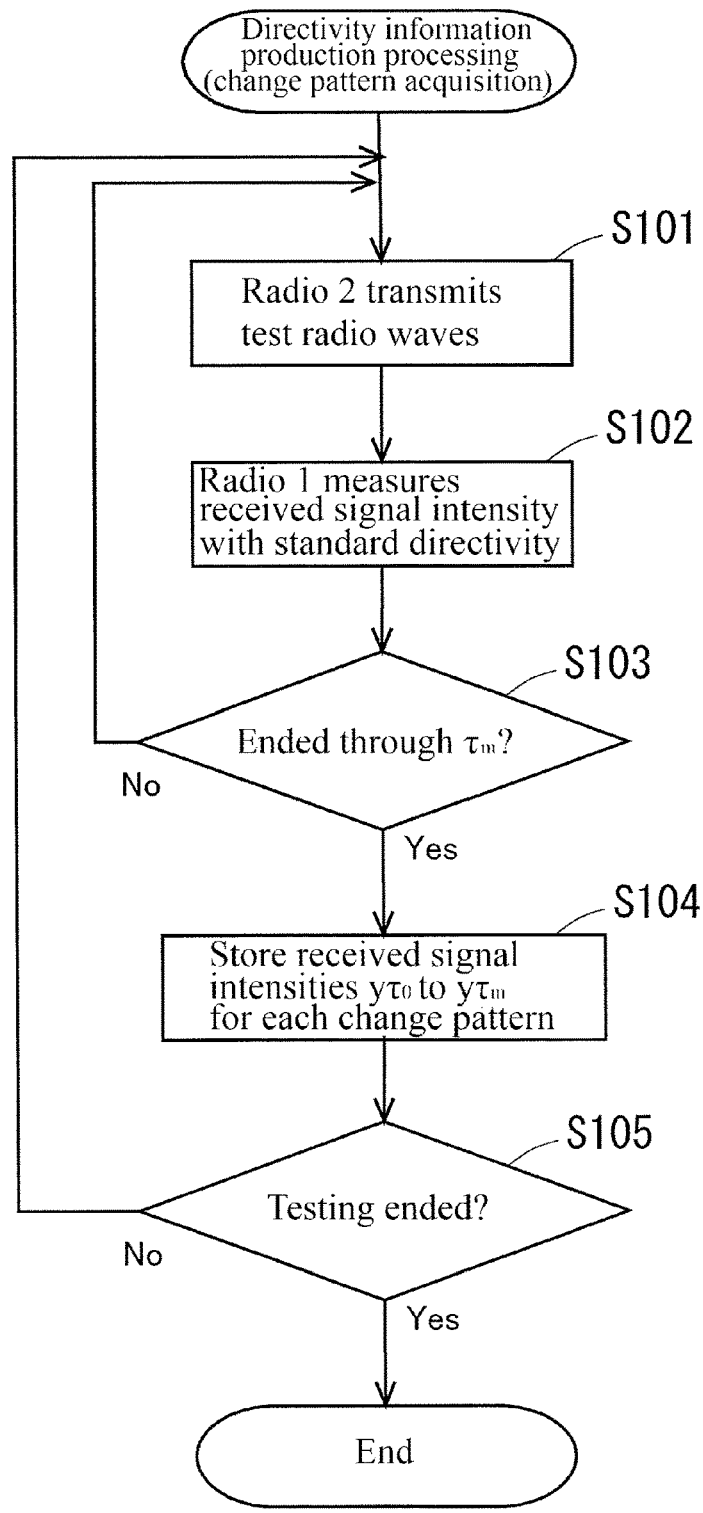
FIG. 4 is a flowchart of processing in which a change pattern is acquired in order to produce directivity information in the wireless communication control system shown in FIG. 1.
Figure 5:
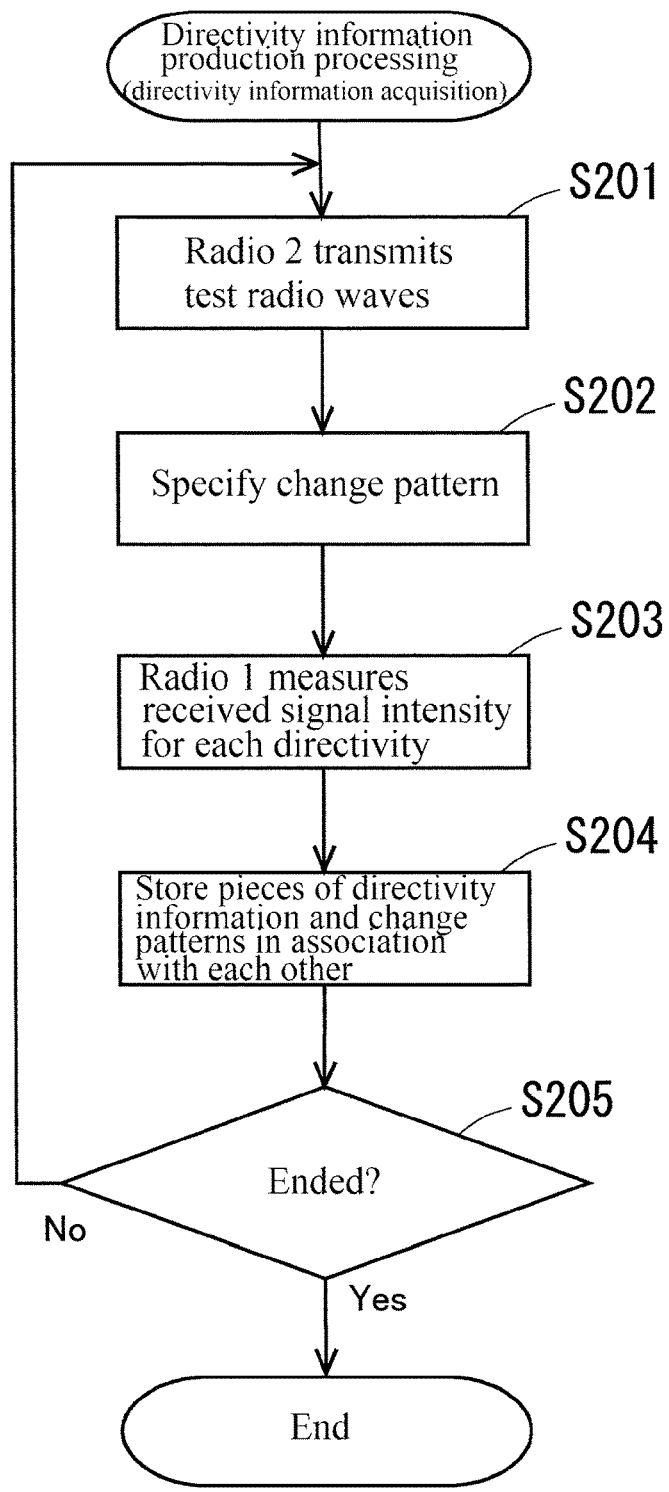
FIG. 5 is a flowchart of processing in which directivity information is acquired and associated with the change pattern in order to produce directivity information in the wireless communication control system shown in FIG. 1.

The flow of processing for producing this directivity information is shown in the flowchart in FIGS. 4 and 5. This directivity information production processing is executed through cooperation of the directivity information production unit 103 of the radio 1 and the directivity information production unit 202 of the radio 2a. Hereinafter, this directivity information production processing will be described. FIG. 4 shows processing for acquiring a change pattern corresponding to the operation of the operator or the device such as the robot 3a or the like in the directivity information production processing. First, the processing in FIG. 4 is started by the radio 2a with an instruction given by a measurer, and in step S101, the radio 2a transmits test radio waves (first test radio wave transmission step). At this time, the control apparatus 5 drives the robot 3a and the like and the operator performs operations, and in the environment in which this robot 3a or the like, or the operator performs operation, the radio 1 receives test radio waves with directivity determined for testing in step S102 (hereinafter also referred to as "standard directivity") at certain intervals (sampling intervals) i such as $\tau_0, \tau_1, \tau_2 \ldots \tau_m$, in parallel to transmission by the radio 2a. This reception is repeated in step S103 from $\tau_0$ to $\tau_m$, and collection of the intensities of test radio waves received from $\tau_0$ to $\tau_m$, that is, the received signal intensity $Y=\{y_{\tau 0}, y_{\tau 1}, y_{\tau 2} \ldots y_{\tau m}\}$ is obtained. Note that an interval i (0≤i≤1) in $\tau_1$ to $\tau_{i+1}$ is a sufficiently short value with respect to a change in the directivity, that is, an interval short enough to sufficiently understand the effect of fading caused by driving control corresponding to the driving pattern or the operation of the operator on the directivity. For example, the interval i of this $\tau_i$ is 0.1 ms to 100 ms, and in this embodiment, it is 1 ms.

In step S104, the radio 1 classifies the received signal intensity $Y=\{y_{\tau 0}, y_{\tau 1}, y_{\tau 2} \ldots y_{Y m}\}$ for each change pattern (hereinafter also referred to as "intensity pattern") of these received signal intensities $y_{\tau 0}$ to $y_{\tau m}$ into $(Y_1, Y_2, Y_3 \ldots Y_n)$ and stores the classified intensities in the memory. For example, the collection of the received signal intensities $y_{\tau 0}$ to $y_{\tau m}$ acquired in a predetermined period or at predetermined time may be used as one change pattern $(Y_1, Y_2, Y_3 \ldots Y_n)$. Also, when the control apparatus 5 causes the robots 3a and 3b and the motor 4 to operate with a predetermined driving pattern, the radio 1 may acquire the received signal intensities $y_{\tau 0}$ to $y_{\tau m}$ when the operation is performed with this driving pattern, and use them as one change pattern for each driving pattern or each sub-pattern obtained by subdividing the driving pattern. For example, as Driving Pattern 1, the control apparatus 5 causes the robot 3a to execute an operation A1 and causes the robot 3b to execute an operation B1 in a state in which the motor 4 is stopped. Furthermore, as Driving Pattern 2, the robot 3a is caused to execute an operation A2, the robot 3b is caused to execute an operation B2, and the motor 4 is caused to execute an operation C2. Here, when the arm of the robot 3a is rotated horizontally as the operation A1, a sub-pattern is obtained by subdividing the driving pattern such as an operation A11 for rightward rotation and an operation A12 for leftward rotation. In this case, a configuration may be adopted in which the radio 1 and the control apparatus 5 are connected to each other only when the directivity information production processing shown in FIGS. 4 and 5 is performed, and the radio 1 recognizes the driving pattern or the sub-pattern by the control apparatus 5 notifying the radio 1 of the driving pattern or the sub-pattern for operating a device or the like, and creates a change pattern for each driving pattern or sub-pattern.

In step S105, the radio 1 determines whether or not testing ended, for example, determines whether or not the series of processes for manufacturing a product ended, and repeats the processing of steps S101 to S104 until testing ends.

FIG. 5 shows processing for acquiring information on the directivity with which a high received signal intensity is obtained for each change pattern acquired in FIG. 4 and producing directivity information.

Figure 8:
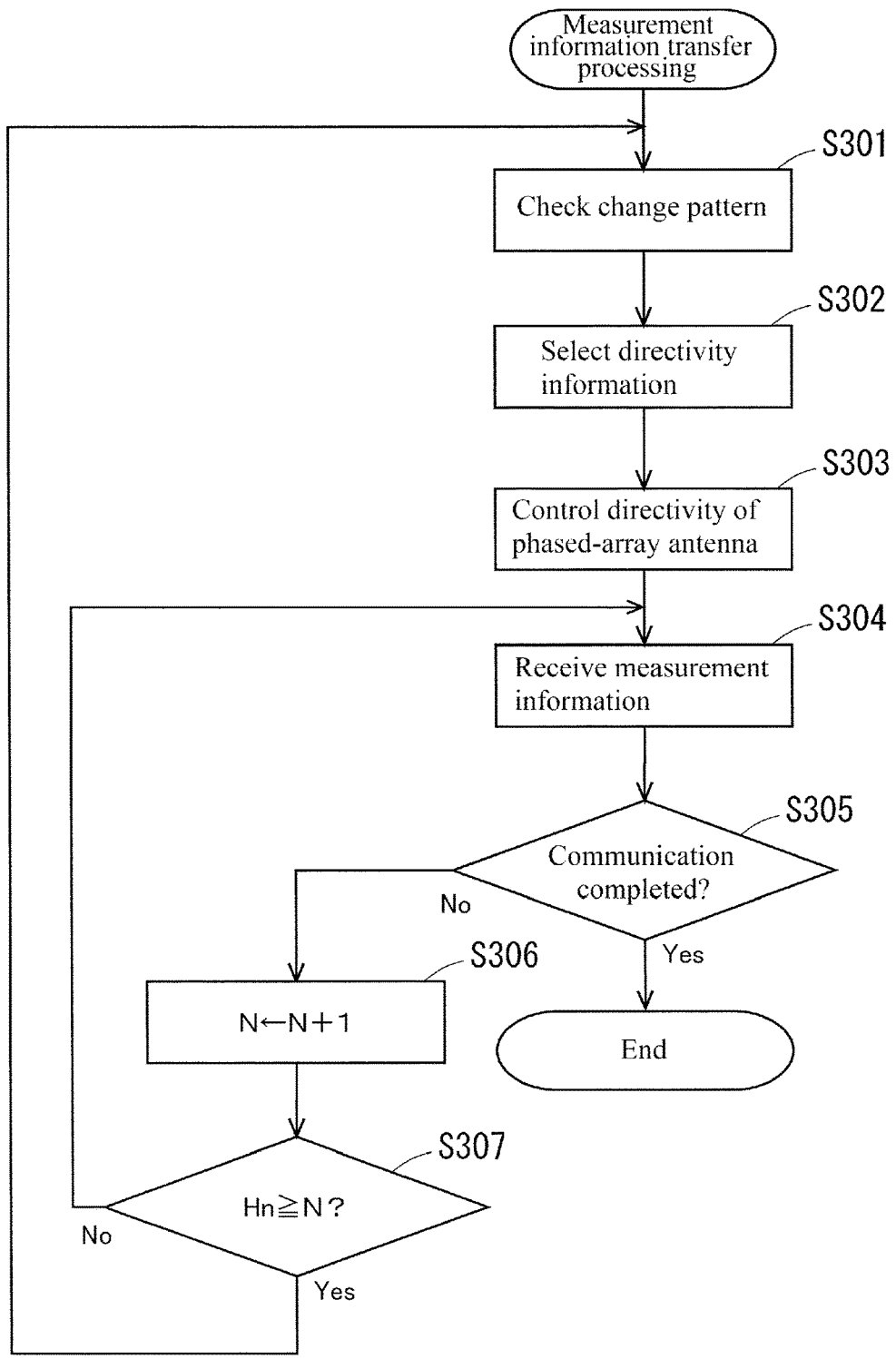
FIG. 8 is a flowchart of processing for transferring measurement information from the radio 2 to the radio 1 in the wireless communication control system shown in FIG. 1.

Moreover, the processing in FIG. 5 is started by the radio 2a, and in step S201, the radio 2a transmits test radio waves (second test radio wave transmission step). At this time, the control apparatus 5 drives the robot 3a and the like and the operator performs operation as well, and in step S202, the radio 1 specifies a change pattern at this point in time in the environment in which the robot 3a and the like or the operator performs operation. This specification of the change pattern makes it possible to execute a predetermined driving pattern for the same manufacturing process as in FIG. 4 and to obtain the same change patterns ($Y_1$, $Y_2$, $Y_3$ ... $Y_n$) at the same time. Also, a change pattern may be specified from the memory by receiving test radio waves with the standard directivity, measuring a change in the received signal intensity, and specifying, from the memory, the change pattern determined to correspond to (e.g., coincide with) this change in the received signal intensity. Note that a method for specifying the change pattern that is determined to correspond to this change in the received signal intensity is similar to the method for selecting a change pattern that is determined to correspond to the change in the received signal intensity in step S302 in FIG. 8, which will be described later.

After the change pattern is specified in step S202, the radio 1 moves to step S203, successively changes the directivity, and measures the received signal intensity. For example, the received signal intensity of test radio waves transmitted from the radio 2a are measured for each directivity that can be set in the phased-array antenna. Thus, if the directivity of the phased-array antenna can be set in pq ways, on the radio 1 side, the received signal intensity for the test radio waves transmitted from the radio 2a corresponding to the directivity of the pq ways is measured for the change patterns ($Y_1$, $Y_2$, $Y_3$ ... $Y_n$) specified in step S202.

In step S204, the radio 1 stores information indicating the directivity (directivity information) with which the received signal has the maximum intensity among the received signal intensities measured in step S203, and the change patterns ($Y_1$, $Y_2$, $Y_3$ ... $Y_n$) specified in step S202 in association with each other.

Then, in step S205, the radio 1 determines whether or not testing ended, that is, determines whether or not processing for all of the change patterns acquired in the processing in FIG. 4 ended, and produces directivity information for each change pattern by repeating processing of steps S201 to S204 until testing ends.

Figure 6:
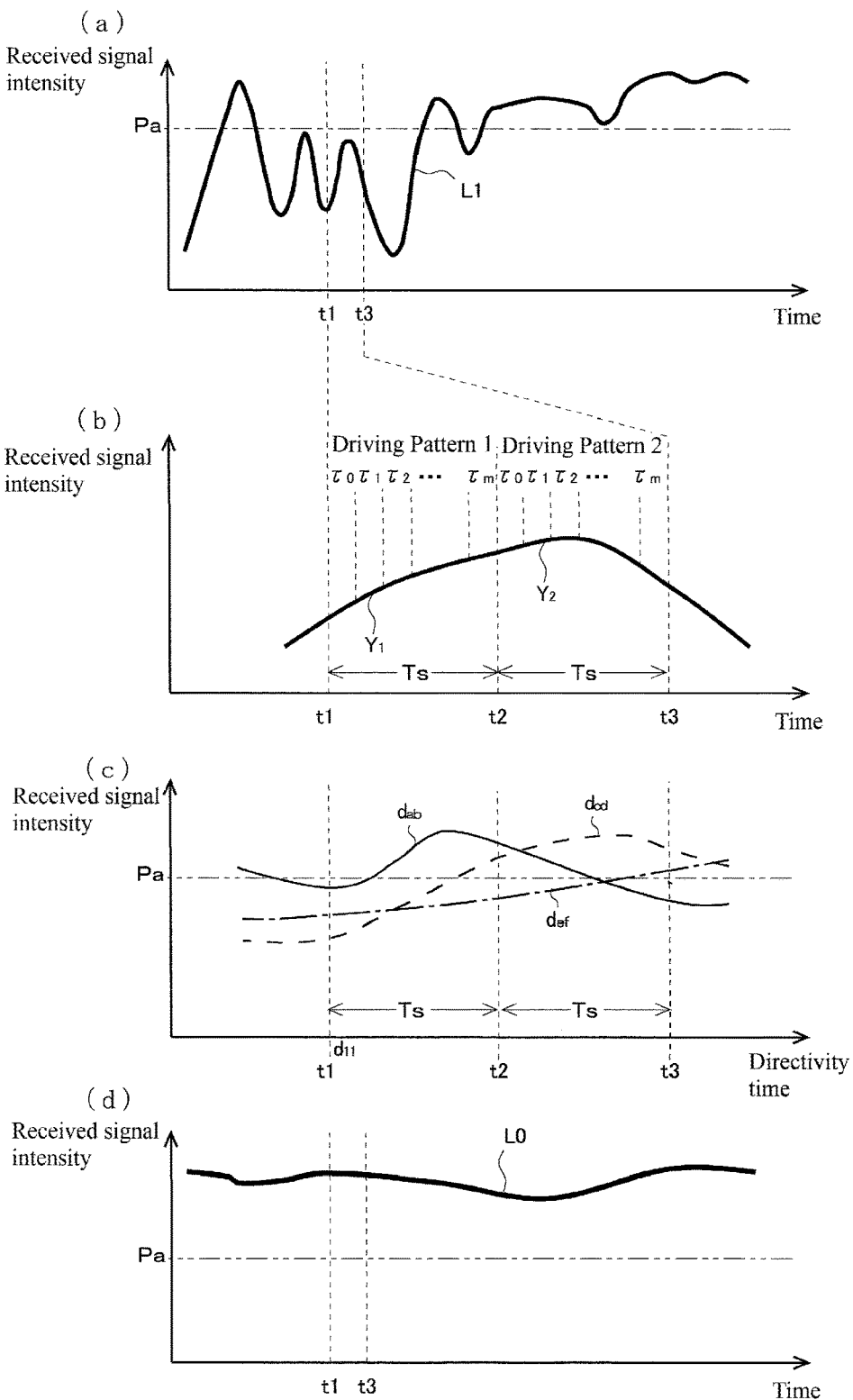
FIG. 6 is a diagram for illustrating a mode for producing directivity information through directivity information production processing shown in FIGS. 4 and 5.

The production of this directivity information will be described with reference to FIG. 6. FIG. 6(a) is a diagram showing, with line L1, a temporal change in the received signal intensity in a case where the vertical axis indicates the received signal intensity, the horizontal axis indicates the time, and the radio 1 performs wireless communication with a specific directivity (for example, standard directivity). In FIG. 6(a), Pa indicates a threshold value when suitable wireless communication can be performed. The example of FIG. 6(a) shows that when wireless communication is performed with the specific directivity, the received signal intensity sometimes falls below the threshold value Pa due to the influence of fading caused by the operation of the operator, the robot 3a, or the like, and the state of suitable wireless communication cannot always be secured.

FIG. 6(b) is an enlarged view of partial periods (time t1 to t3) in FIG. 6(a). In FIG. 6(b), intervals Ts at the times t1, t2, and t3 each correspond to a period during which change patterns are acquired in the processing in FIG. 4, that is, correspond to the period from $\tau_0$ to $\tau_m$. The example of FIG. 6(b) shows a case where the received signal intensity from the time t1 to the time t2 is a change pattern $Y_1$ and the received signal intensity from the time t2 to the time t3 is a change pattern $Y_2$.

FIG. 6(c) shows the result obtained by measuring the received signal intensity of test radio waves transmitted from the above-described radio 2a for each directivity that can be set in the phased-array antenna in the period from the time t1 to the time t2 and the period from the time t2 to the time t3 in the processing in FIG. 5, for example. Note that for simplification, among directivities of pq ways, only directivities $d_{ab}$, $d_{ad}$, $d_{ef}$ are shown in the example of FIG. 6(c). In this manner, in the example of FIG. 6(c), the received signal in the case where the directivity in the period from the time t1 to the time t2 is $d_{ab}$ had the maximum intensity, and the received signal in the case where the directivity in the period from the time t2 to the time t3 is $d_{cd}$ had the maximum intensity. As a result, the change pattern $Y_1$ is associated with the directivity $d_{ab}$, the change pattern $Y_2$ is associated with the directivity $d_{ad}$, and are stored in the memory as the directivity information as shown in FIG. 7. The production of this directivity information is carried out on other change patterns ($Y_3$ ... $Y_n$), and for all of the change patterns ($Y_1$, $Y_2$, $Y_3$ ... $Y_n$) obtained through the series of processes for manufacturing a product in the factory in which this system is provided, the directivities with which the received signal has the maximum intensity are successively selected and stored as the directivity information. That is, even in a situation in which the received signal intensity decreases with the standard directivity due to the influence of fading caused by the operation of the operator, the robot 3a, or the like, if the directivity indicated in the directivity information is set in the phased-array antenna, the highest received signal intensity can be obtained.

FIG. 6(d) shows time transition of the received signal intensity in the case where the directivity of the phased-array antenna is controlled as appropriate in accordance with this directivity information. For example, in the case where wireless communication is performed with the standard directivity, in the situation in which the received signal intensity transitions as line L1 in FIG. 6(a), time transition of the received signal intensity in the case where the directivity of the phased-array antenna is set based on this directivity information in accordance with the change patterns is indicated with line L0 in FIG. 6(d). The directivity information that follows the line L0 in this manner always achieves a higher received signal intensity than the threshold value Pa by appropriately controlling the directivity of the phased-array antenna in accordance with the change patterns, and enables wireless communication in which the influence of fading caused by the operation of the operator, the robot 3a, or the like is suppressed.

Note that in the production of the directivity information in step S204 above, the directivities with which the received signal has the maximum intensity at control times are selected. Instead of this mode, the directivities for the change patterns may be selected such that the received signal intensity is in a predetermined range in the series of manufacturing processes. Stable wireless communication having little fluctuation in the received signal intensity can be realized between the radio 1 and the radio 2a even through the production of the directivity information in this manner.

Also, because the above-described directivity information is produced based on test radio waves transmitted from the radio 2a to the radio 1, strictly speaking, the directivity information can be suitably utilized when the radio 1 receives information from the radio 2a. However, in many cases, the directivity of the phased-array antenna when information is transferred from the radio 2a to the radio 1 and the directivity of the phased-array antenna when information is transferred from the radio 1 to the radio 2a can be considered to be the same. In view of this, based on this point, the directivity information corresponding to the change patterns obtained through the above-described directivity information production processing may be applied to the phased-array antenna when information is transferred from the radio 1 to the radio 2a.

Directivity information applied to the phased-array antenna when information is transferred from the radio 1 to the radio 2a may be produced separately, as another method. In this case, in the state in which the operator, the robot 3a, or the like performs operation, a change pattern is specified and is changed in pq ways that can set the directivity of the phased-array antenna for each change pattern, test radio waves are transmitted from the radio 1 to the radio 2a, and the received signal intensity at this time is measured by the radio 2a. Then, it is sufficient that information relating to the measured received signal intensity is transferred to the radio 1, and the radio 1 produces and stores directivity information by as shown in step S204 in FIG. 5.

Also, the relative position of the radio 2b with respect to the radio 1 is different from that of the radio 2a, and thus it is necessary to separately produce directivity information for wireless communication between the radio 2b and the radio 1. Note that in this production, the directivity information need only be produced substantially similarly to the case of the radio 2a.

Measurement Information Transfer Processing

The radio 1 has information on the change pattern and directivity information produced through the directivity information production processing shown in FIGS. 4 and 5, and thus the radio 1 and the radio 2a can realize various types of information transfer via wireless communication in the state in which the effect of fading caused by the operation of the operator, the robot 3a, or the like is suppressed. In view of this, measurement information transfer processing, which is one aspect of this information transfer, will be described with reference to FIGS. 8 and 9. This measurement information transfer processing is executed by the radio 1 in order to transfer information on the temperature measured by the radio 2a to the radio 1 via wireless communication.

The radio 1 of this embodiment regularly checks a change pattern and controls directivity in accordance with the change pattern when performing wireless communication. Thus, the radio 1 has a period (a time slot 51, which will be described later) during which the change pattern is checked, every time a period (a time slot 52, which will be described later) during which the temperature information is transferred is repeated a predetermined times of repetitions. First, in step S301, the acquisition unit 101 receives radio waves from the radio 2a with the standard directivity in order to check the change pattern, measures a change in the received signal intensity in the sampling interval i, and the obtained received signal intensity is $v_j=(v_1, v_2, v_3 \ldots v_n)^\tau$. Next, in step S302, a likelihood that it is determined that the change patterns $(Y_1, Y_2, Y_3 \ldots Y_n)$ stored in the memory by the directivity information storage unit 12 correspond to the received signal intensity $v_j$ acquired in step S301 is obtained by the following equation.

$L_j = ap\ (v_j|Y_j)$ where a indicates any positive proportionality constant

Moreover, the acquisition unit 101 selects, from among pieces of the directivity information stored in the memory, directivity information corresponding to a change pattern with the highest likelihood $L_j$.

Then, in step S303, the execution unit 102 applies the selected directivity information to the phased-array antenna, and in step S304, the radio 1 receives, from the radio 2a, temperature information (environmental parameters) through wireless communication with the radio 2a in a state in which the directivity is set.

The execution unit 102 determines in step S305 whether or not communication is complete. If communication is complete (step S305, Yes), the execution unit 102 ends the processing in FIG. 8, whereas if communication is not complete (step S305, No), the number of instances (communication count) N of a period (the later-described time slot 52) during which temperature information is transferred is incremented in step S306, and the processing moves to step S307.

Figure 9:
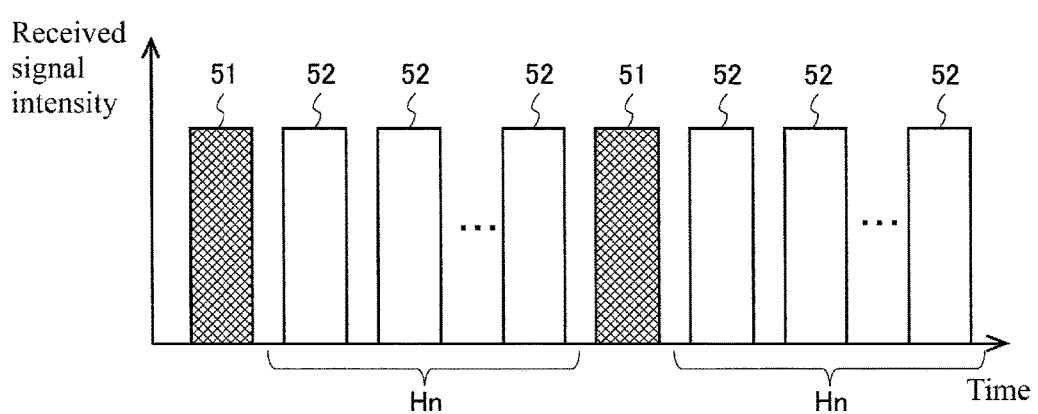
FIG. 9 is a diagram for illustrating a time slot for checking a change pattern and a time slot for communication of temperature information in measurement information transmission processing shown in FIG. 8.

The execution unit 102 determines in step S307 whether or not the communication count N has reached a predetermined value Hn. If the communication count N has not reached the predetermined value Hn (step S307, No), the execution unit 102 repeats wireless communication in step S304, whereas if the communication count N has reached the predetermined value Hn (step S307, Yes), the execution unit 102 clears the communication count N and repeats the processing of step S301 onward. That is, a change pattern is checked every time transfer of the temperature information is repeated Hn times. FIG. 9 shows the time slot 51, which is a period during which the change pattern is checked in step S301, and the time slot 52, which is a period during which communication of temperature information is performed in step S304. Accordingly, the change pattern is checked each time a predetermined communication count N is reached, and the directivity of the phased-array antenna is controlled as appropriate in accordance with this change pattern so as to perform wireless communication. As shown in FIG. 9, in the time slot 51 that opens once in Hn times, the radio 1 receives radio waves from the radio 2a with the standard directivity and checks the change pattern, and in other time slots 52, the radio 1 receives temperature information from the radio 2a with the directivity that the radio 1 sets based on the directivity information. Note that although the step of counting the number of time slots 51 and 52 as the communication count and regularly checking the change pattern in step S301 is performed in the examples in FIGS. 8 and 9, there is no limitation to this, and a step of counting the number of packets or the amount of data and checking the change pattern when the number of packets or the amount of data reaches a predetermined value may be performed. Also, a configuration may be adopted in which it is determined in step S307 whether or not the received signal intensity when the temperature information is received in step S304 falls below the predetermined value Pa, regardless of the communication count, and if the received signal intensity exceeds the predetermined value Pa (step S307, No), wireless communication in step S304 is repeated, whereas if the received signal intensity falls below the predetermined Pa (step S307, Yes), the communication count N is cleared and the processing of step S301 onward is repeated.

By performing wireless communication with the radio 2a along with such directivity control, the radio 1 can receive temperature information from the radio 2a and stably collect information in the state in which the radio 1 is not easily influenced by fading caused by the operation of the operator or the device such as the robot 3a. Note that transfer of temperature information from the radio 2a is only mentioned in the measurement information transfer processing shown in FIG. 8, but even in the case where information such as control information is transferred from the radio 1 to the radio 2a, the information is suitably transferred to the radio 2a by similarly controlling the directivity of the phased-array antenna in accordance with the change pattern.

Also, the measurement information transfer processing shown in FIG. 7 is applied to wireless communication between the radio 1 and the radio 2b. Moreover, if the radio 2a and the radio 2b are disposed relatively closely, driving directivity information applied to wireless communication between the radio 1 and the radio 2a and wireless communication between the radio 1 and the radio 2b may be used as shared directivity information. That is, in the radio group constituted by the radio 2a and the radio 2b, if the two radios are close to each other, the relative positions thereof with respect to the radio 1 do not have a large difference in some cases, and the influence of fading between radios can be considered to be the same. In such a case, the load of processing for transferring measurement information can be reduced by making the directivity information applied to the phased-array antenna of the radio 1 shared in wireless communication between the radio 1 and each radio belonging to the radio group. Note that if the shared driving directivity information is applied, wireless communication between the radio 1 and the radio 2a and the wireless communication between the radio 1 and the radio 2b may be performed alternatively or may be performed simultaneously.

Modification

Although the position of the radio 2a does not change in the above-described embodiment, instead of this, the radio 2a may be configured to move by a motor or the like whose driving is controlled by the control apparatus 5. In this mode, in the case where the relative position of the radio 2a with respect to the radio 1 changes, change patterns in the state in which this relative position changes are associated with information indicating the directivity with which a high received signal intensity is obtained, and the change patterns and the information are stored as the directivity information. Accordingly, even if the relative position of the radio 2a with respect to the radio 1 changes, similarly to the above-described embodiment, selecting the directivity information in accordance with the change patterns and applying this directivity information to the phased-array antenna make it possible to protect wireless communication between the radio 1 and the radio 2a from the influence of fading and to realize suitable wireless communication.

There is no limitation to this, and if the relative position of the radio 2a with respect to the radio 1 changes, directivity information may be produced in accordance with the relative position of the radio 2a with respect to the radio 1. Moreover, a configuration may be adopted in which in the case where the control apparatus 5 causes the radio 2a to move by controlling the driving of the motor or the like, the control apparatus 5 notifies the radio 1 of the relative position of the radio 2a with respect to the radio 1 with a cable or wirelessly, the radio 1 applies, to the phased-array antenna, the directivity information corresponding to the change pattern among pieces of the directivity information based on this relative position, and performs wireless communication between the radio 1 and the radio 2a. Accordingly, even if the directivity information significantly changes in accordance with the relative position of the radio 2a with respect to the radio 1, it is possible to protect wireless communication from the influence of fading and to realize suitable wireless communication.

INDEX TO THE REFERENCE NUMERALS 1, 2a, 2b Radio
3 Robot
4 Motor
5 Control apparatus
10 Wireless communication control system (system)

The invention claimed is:

1. A wireless communication control system comprising:
a first radio comprising a directional antenna; and
a second radio performing wireless communication with the first radio;
the first radio comprising a processor configured with a program to perform operations comprising:
operation as a directivity information storage unit that stores a plurality of pieces of directivity information, wherein each piece of the plurality of pieces of directivity information relates a predetermined directivity to a change pattern of a received signal, the change pattern indicating a temporal change in a received signal intensity of the received signal at a reception radio when wireless communication is performed between the first radio and the second radio with the predetermined directivity applied to the directional antenna, the reception radio being one of the first radio and the second radio,
operation as an acquisition unit that acquires the temporal change in the received signal intensity when wireless communication is performed between the first radio and the second radio via the directional antenna to which the predetermined directivity is applied, and
operation as an execution unit that:
selects, from among the pieces of directivity information stored in the directivity information storage unit, directivity information corresponding to the change pattern determined based on the temporal change in the received signal intensity acquired by the acquisition unit;
applies the selected directivity information to the directional antenna; and
executes wireless communication between the first radio and the second radio.

2. The wireless communication control system according to claim 1, wherein the directivity information is set such that applying the directivity information to the directional antenna of the first radio causes the received signal intensity in the change pattern of the received signal received by the reception radio to be above a predetermined threshold.

3. The wireless communication control system according to claim 1, wherein
the second radio is disposed on a driving device whose driving is controlled in accordance with a plurality of predetermined driving patterns, a relative position of the second radio with respect to the first radio changes due to the driving device being moved in accordance with the driving patterns, and the directivity information is produced according to a change in the relative position of the second radio with respect to the first radio.

4. The wireless communication control system according to claim 1, wherein positions of the first radio and the second radio do not change relative to each other.

5. The wireless communication control system according to claim 1, further comprising a plurality of the second radios, wherein the plurality of second radios each alternatively communicate with the first radio, the processor of the first radio is configured with the program to perform operations such that:

operation as the directivity information storage unit further comprises storing directivity information that corresponds to each of the plurality of second radios and is applied to the directional antenna of the first radio in relation to wireless communication between the first radio and the plurality of second radios in accordance with the plurality of driving patterns to perform driving of one or more driving devices in accordance with the plurality of predetermined driving patterns, and operation as the execution unit further comprises selecting, from among the pieces of directivity information stored in the directivity information storage unit, directivity information that corresponds to the driving pattern acquired by the acquisition unit and corresponds to the plurality of second radios, and executing wireless communication between the first radio and the plurality of second radios in accordance with the selected directivity information.

6. The wireless communication control system according to claim 1, further comprising a plurality of the second radios, wherein a second radio group comprising the plurality of second radios communicates with the first radio, the processor of the first radio is configured with the program to perform operations such that:

operation as the directivity information storage unit further comprises storing directivity information that corresponds to the second radio group and is applied to the directional antenna of the first radio in relation to wireless communication between the first radio and the second radio group in accordance with the plurality of driving patterns to perform driving of one or more driving devices in accordance with the plurality of predetermined driving patterns, and operation as the execution unit further comprises selecting, from among the pieces of directivity information stored in the directivity information storage unit, target directivity information that corresponds to the driving pattern acquired by the acquisition unit and corresponds to the second radio group, and executing wireless communication between the first radio and the second radio group in accordance with the selected target directivity information.

7. The wireless communication control system according to claim 1, wherein the second radio is a sensor-equipped radio comprising a sensor that measures a predetermined environmental parameter.

8. The wireless communication control system according to claim 1, wherein the directional antenna comprises a phased-array antenna.

9. The wireless communication control system according to claim 1, wherein the execution unit executes wireless communication for determining the change pattern with the predetermined directivity every time wireless communication between the first radio and the second radio is executed with a directivity that is based on the selected directivity information for a predetermined period.

10. A radio comprising:

a directional antenna for performing wireless communication with a partner communication device; and a processor configured with a program to perform operations comprising:

operation as a directivity information storage unit that stores a plurality of pieces of directivity information, wherein each piece of the plurality of pieces of directivity information relates a predetermined directivity to a change pattern, the change pattern indicating a temporal change in a received signal intensity at a reception radio when wireless communication is performed between the radio and the partner communication device with the predetermined directivity applied to the direction antenna, the reception radio being one of the radio and the partner communication device, operation as an acquisition unit that acquires the temporal change in the received signal intensity when wireless communication is performed with the partner communication device via the directional antenna to which the predetermined directivity is applied, and operation as an execution unit that:

selects, from among the pieces of directivity information stored in the directivity information storage unit, directivity information corresponding to the change pattern determined based on the temporal change in the received signal intensity acquired by the acquisition unit;

applies the selected directivity information to the direction antenna; and executes wireless communication with the partner communication device.

11. A wireless communication control apparatus that controls wireless communication performed by a first radio with a second radio via a directional antenna in a predetermined environment in which driving of one or more driving devices is controlled in accordance with a plurality of predetermined driving patterns, the wireless communication control apparatus comprising a processor configured with a program to perform operations comprising:

operation as a directivity information storage unit that stores a plurality of pieces of directivity information, wherein each piece of the plurality of pieces of directivity information relates a predetermined directivity to a change pattern, the change pattern indicating a temporal change in a received signal intensity at a reception radio when wireless communication is performed with a predetermined directivity applied to the direction antenna, the reception radio being one of the first radio and the second radio, operation as an acquisition unit that acquires the temporal change in the received signal intensity when wireless communication is performed between the first radio and the second radio via the directional antenna to which the predetermined directivity is applied, and operation as an execution unit that:

selects, from among the pieces of directivity information stored in the directivity information storage unit, directivity information corresponding to the change pattern determined based on the temporal change in the received signal intensity acquired by the acquisition unit;

applies the selected directivity information; and executes wireless communication between the first radio and the second radio.

12. A method for controlling wireless communication that controls wireless communication performed by a first radio with a second radio via a directional antenna in a predetermined environment in which driving of one or more driving devices is controlled in accordance with a plurality of predetermined driving patterns, the method comprising:

acquiring a temporal change in a received signal intensity when wireless communication is performed between the first radio and the second radio via the directional antenna to which a predetermined directivity is applied;

selecting, from a directivity information storage unit that stores a plurality of pieces of directivity information, wherein each piece of the plurality of pieces of directivity information relates a predetermined directivity to a change pattern, the change pattern indicating the temporal change in the received signal intensity at a reception radio when wireless communication is performed between the first radio and the second radio with the predetermined directivity applied to the directional antenna, the reception radio being one of the first radio and the second radio; and applying the selected directivity information to the directional antenna and executing wireless communication between the first radio and the second radio.

13. The method for controlling wireless communication according to claim 12, wherein the directivity information is set such that applying the directivity information to the directional antenna of the first radio causes the received signal intensity in the change pattern of the received signal received by the reception radio to be above a predetermined threshold.

14. The method for controlling wireless communication according to claim 12, wherein the second radio is disposed on a driving device whose driving is controlled in accordance with a plurality of predetermined driving patterns, a relative position of the second radio with respect to the first radio changes due to the driving device being moved in accordance with the driving patterns, and the directivity information is produced according to a change in the relative position of the second radio with respect to the first radio.

15. The method for controlling wireless communication according to claim 12, wherein positions of the first radio and the second radio do not change relative to each other.

16. The method for controlling wireless communication according to claim 12, wherein: the second radio further comprises a plurality of the second radios each of which alternatively communicate with the first radio, the method further comprising:

storing directivity information that corresponds to each of the plurality of second radios and is applied to the directional antenna of the first radio in relation to wireless communication between the first radio and the plurality of second radios in accordance with the plurality of driving patterns to perform driving of one or more driving devices in accordance with the plurality of predetermined driving patterns, selecting, from among the stored pieces of directivity information, directivity information that corresponds to the acquired driving pattern and corresponds to the plurality of second radios, and executing wireless communication between the first radio and the plurality of second radios in accordance with the selected directivity information.

17. The method for controlling wireless communication according to claim 12, wherein: the second radio further comprises a plurality of the second radios, and a second radio group that comprises the plurality of second radios communicates with the first radio, the method further comprising:

storing directivity information that corresponds to the second radio group and is applied to the directional antenna of the first radio in relation to wireless communication between the first radio and the second radio group in accordance with the plurality of driving patterns to perform driving of one or more driving devices in accordance with the plurality of predetermined driving patterns, selecting, from among the stored pieces of directivity information, target directivity information that corresponds to the acquired driving pattern and corresponds to the second radio group, and executing wireless communication between the first radio and the second radio group in accordance with the selected target directivity information.

18. The method for controlling wireless communication according to claim 12, further comprising executing wireless communication for determining the change pattern with the predetermined directivity every time wireless communication between the first radio and the second radio is executed with a directivity that is based on the selected directivity information for a predetermined period.

19. A directivity information production method for producing directivity information that is applied to a directional antenna in wireless communication performed by a first radio with a second radio via the directional antenna in a predetermined environment in which driving of one or more driving devices is controlled in accordance with a plurality of predetermined driving patterns, the method comprising:

transmitting test radio waves from a first transmission radio to a reception radio when driving of the one or more driving devices is controlled in accordance with the plurality of driving patterns, the reception radio being one of the first radio and the second radio;

measuring a change in a received signal intensity of the test radio waves when the test radio waves transmitted from the first transmission radio are received by the reception radio, and acquiring a change pattern in the received signal intensity corresponding to the driving pattern;

transmitting test radio waves at a plurality of control times that are set in an execution period during which a driving pattern is executed, from a second transmission radio to the reception radio when driving of the one or more driving devices is controlled in accordance with the plurality of driving patterns; and measuring a received signal intensity of test radio waves when the test radio waves transmitted from the second transmission radio are received by the reception radio, and producing directivity information comprising a directivity for each change pattern corresponding to the plurality of driving patterns, the directivity information being applied to the directional antenna of the first radio in relation to wireless communication between the first radio and the second radio when driving of the one or more driving devices is controlled in accordance with the plurality of driving patterns such that the received signal has an intensity above a predetermined threshold.

* * * * *